(12) United States Patent
Arduino (10) Patent No.: US 6,885,998 B1
(45) Date of Patent: Apr. 26, 2005

(54) INTERNET-BASED SPORTS EQUIPMENT RENTAL METHOD

(76) Inventor: Mark J. Arduino, 28 Village Dr., Mahwah, NJ (US) 07430

( * ) Notice: Subject to any disclaimer, the term of this patent is extended or adjusted under 35 U.S.C. 154(b) by 0 days.

(21) Appl. No.: 09/536,346

(22) Filed: Mar. 25, 2000

(51) Int. Cl.$^7$ .............................................. G06F 17/60
(52) U.S. Cl. ....................................................... 705/26
(58) Field of Search ..................................... 705/26, 27

(56) References Cited

U.S. PATENT DOCUMENTS

| | | | | |
|---|---|---|---|---|
| 5,396,417 A | * | 3/1995 | Burks et al. ................... | 705/17 |
| 5,673,306 A | * | 9/1997 | Amadon et al. ............ | 455/406 |
| 5,812,641 A | * | 9/1998 | Kanoh et al. ............ | 379/91.02 |
| 6,014,137 A | * | 1/2000 | Burns ......................... | 345/747 |

FOREIGN PATENT DOCUMENTS

EP        0 846 301 B1 *   8/1996

OTHER PUBLICATIONS

Gart, Ken, "Specialty SPorts Venture's New Website Offers Online Ski/Snowboard Rental; Go Surfing Before Hitting the Ski Slopes and Rent Equipment in Advance!" PR Newswire, New York, Nov. 4, 1999.*

Ramsdell, Paul, "Pair Suited for Sahalee Course/Local Pro Picks Irwin, Love III as Favorites TO Win PGA Championship", The News Tribune, Tacoma, May 28, 1998.*

Krebs, Michelle, "Small biz propels surge in leasing," Oct 27, 1997.*

"Business News Briefs; Samsung Rental Joins Hands with Cellhire," Korea Herald, Sep. 24, 1997.*

Cellhire.com, Jan. 1, 1999, http://web.archive.org/web/*/www.cellhire.com.*

"Pair Suited For Salhalee Course/Local Pro Picks Irwin, Love III as Favorites to win PGA Championship," The News Tribune, Tacoma, Wa, May 28, 1998, Paul Ramsdell.*

"Small biz propels surge in leasing," Crain's Detroit Business, Detroit, Oct. 27, 1997, Michelle Krebs.*

"Rental store is ready for spring lawn, garden rush," Norfolk Daily News, Norfolk, Neb.; Apr. 21, 1993, Erbst Laura.*

"New company lets travelers leave their clubs at home," Orly Sigal, Business Journal, Jacksonville, Mar. 15, 2002, vol. 17, Iss 22, p. S11.*

"Dear Myrtle: It's almost vacation time: [Final Edition]," Chick Cavalaris, News Sentinel, Knoxville, Tenn, Jun. 17, 2001, p. c.2.*

"February Notebook: News from Caledonia, Blackmoor and More," Myrtle Beach, S.C., Feb. 1, 2002.*

* cited by examiner

Primary Examiner—Jeffrey A. Smith
Assistant Examiner—Matthew Gart
(74) Attorney, Agent, or Firm—Otho B. Ross (57) ABSTRACT

Disclosed is an Internet-based sports equipment rental system and method that enables individuals to rent sports equipment and other items, such as golf clubs, from a renting company's Web site. The system and method includes automated rental processing and tracking software that runs on the renting company's Web site to allow individuals to rent sports equipment conveniently over the Internet for use at predetermined locations at predetermined future times.

1 Claim, 6 Drawing Sheets

INTERNET-BASED SPORTS EQUIPMENT RENTAL METHOD

FIELD OF THE INVENTION

This invention relates to electronic commerce in the area of rentals. Specifically, this invention relates to information processing and business methods for renting items of sports equipment such as golf clubs via the Internet.

BACKGROUND OF THE INVENTION

Outdoor sports such as golf are, of course, quite popular and are increasing in popularity. Many of these sports require the use of heavy or bulky equipment. In the case of golf, the player must use clubs, bag, balls, tees, shoes, apparel and other accessories. For other sports, such as skiing, snowboarding, scuba diving, surfing, skating and boating, different bulky equipment is required. This equipment usually must be customized in some way to each individual player, such as the player's height, weight, playing ability, shoe size and preferred brand of equipment. As used herein, the term "equipment" includes clothing and other wearable items.

Because of the size and weight of much outdoor sports equipment, the consumer is faced with the problem of how to rent, locate, assemble, protect, transport, clean and otherwise manage the equipment while still enjoying the sport. In many ways, this problem is getting worse, because although technology continues to improve upon the performance, safety and appearance of the equipment, many of these advances ironically make the equipment even heavier and bulkier. For example, the currently popular "oversize" golf "woods" (such as the "Big Bertha® and HawkEye® brands manufactured by Callaway, Inc.) are much larger and heavier than traditional woods. The newer equipment is also usually much more expensive than the older equipment, which adds an additional problem of how to better and more securely protect (such as with stronger bags) the valuable equipment during storage, transport and use.

This "equipment problem" becomes even more of a burden when the consumer wishes to travel to a remote location, such as a warm-weather resort, to play golf or otherwise participate in a sport. If the consumer does not play frequently, then clubs, skis, etc. may need to be searched for in a dusty garage or basement full of miscellaneous items. Even for a professional or frequent player, merely gathering golf equipment, for example, for a local round of golf is troublesome.

Use of the equipment-need not, of course, be "outdoors." Some indoor or covered facilities are available for use or practice, such as driving ranges or simulated courses.

When the travel destination requires air travel, then the problems multiply further. Although some players prefer to carry his or her own sports equipment, many do not because of the difficulties. Not only must the equipment be fitted with a strong carrying case to withstand the rigors of baggage handling, but the player must carry and watch an additional item of luggage that may be a target of theft; manage other travel plans such as car rentals at the destination; and perhaps even pay an additional baggage or handling fee to the airline.

Thus, a real long-felt need exists for a system and method for conveniently managing and arranging for the rental of sports equipment on a scalable, high-volume basis, particularly at remote locations. Ideally, the consumer should be able to easily reserve high-quality rental equipment in advance, preferably together with other travel arrangements, but at least prior to departure. Of course, many requests to rent equipment will be ad-hoc.

Thus, a central coordination facility is needed for worldwide service so that golf clubs or other equipment is available to the consumer upon his or her arrival at the destination, or at least can be made available quickly upon location. The Internet makes such coordination possible.

The above-mentioned need has not been filled. Local sports equipment rental shops near resort or vacation destinations have attempted to overcome some of the above-mentioned problems, but this usually is not a satisfactory solution. In some cases, it is no solution at all. For example, unlike ski rental shops, there are virtually no independent golf rental shops. Some local golf pro shops will rent clubs, but it is usually only an "afterthought" or a low-priority part of the business. Even when rental shops exist, the player-traveler must locate a suitable shop; make a separate trip; wait in line; try out the equipment; and pay high prices. Desired brands of equipment may not be available (if there is any choice at all), and even if equipment is finally obtained, it is usually of poor quality.

Some national car rental companies will rent a standardized cellular or car phone to a traveler as an additional service. See, for example, Kanoh et al. U.S. Pat. No. 5,812,641 and Amadon et al. U.S. Pat. No. 5,673,306. But such services are not suitable for use in renting sports equipment, where the equipment is orders of magnitude larger and bulkier than cell phones; where the consumer usually prefers a particular brand; and where the rental sports items must be customized in some way to the renter, such as the renter's height, weight, playing ability, shoe size or preferred brand.

SUMMARY OF THE INVENTION

To overcome the aforesaid problems, disclosed is an Internet-based sports equipment rental system and method that enables individuals to rent sports equipment and other items, such as golf clubs, from a renting company's Web site. The system and method includes automated rental processing and tracking software that runs on the renting company's Web site to allow individuals to rent sports equipment conveniently over the Internet for use at predetermined locations at predetermined future times.

In one embodiment, the invention provides a method of renting sports equipment over the Internet, the method comprising the steps of:

establishing an Internet World Wide Web site, said site operating as a consumer interface for consumers who wish to rent at least one item of sports equipment at predetermined locations and at predetermined future times;

receiving requests from said consumers at said site for one or more of said items desired to be rented by said consumers at predetermined locations and at predetermined future times; and arranging for said items to be delivered to said consumers at said locations at said future times.

In another embodiment, the invention comprises the method of:

establishing an Internet World Wide Web site, such as GOLFRENT.COM, operating as a consumer interface for consumers who wish to rent at least one item of sports equipment at a predetermined location and at predetermined future time;

establishing a computer database coupled to said site, said database containing availability information relating to the availability, location and rental price of a plurality of items of sports equipment;

receiving consumer requests at said site for one or more of said items desired to be rented by said consumer at a predetermined location and at a predetermined future time;

storing said consumer requests in said database;

comparing said requests with said availability information;

notifying said consumer whether said consumer requests match said availability and rental information;

receiving consumer verification and rental payment information;

notifying a storage facility and a delivery service of said selected rental items, rental location and rental time;

arranging for said selected rental items to be personally delivered to said consumer at said rental location at said rental time.

From the consumer's viewpoint, the present invention is used by:

visiting a sports equipment rental Internet Web site using communications equipment and software;

browsing said Web site for the availability of desired rental items of said sports equipment at a predetermined area and at a predetermined future time;

selecting said desired rental items;

sending personal and rental payment information to said Web site; and personally receiving said desired rental items at said predetermined area at said predetermined future time.

BRIEF DESCRIPTION OF THE DRAWINGS

These and other features and advantages of the invention will now be described with reference to the drawings of certain preferred embodiments, which are intended to illustrate and not to limit the invention, and in which like reference numbers represent corresponding parts throughout, and in which.

DETAILED DESCRIPTION OF THE PREFERRED EMBODIMENTS

To facilitate a complete understanding of the invention, the description of the preferred embodiment is arranged within the following sections:

1. OVERVIEW
2. SYSTEM AND BUSINESS COMPONENTS
3. RENTAL OPERATIONS
4. EQUIPMENT RETURN OPERATIONS
5. CONCLUSION.

1. Overview

To best understand the present invention, it is useful to start with the consumer. Whether he or she is a seasoned or beginning golfer or other sports enthusiast, the consumer may have plans to travel to a resort destination for either vacation or business. Either one of these reasons for travel requires planning and reservations for basics, such as lodging and ground transportation. For lodging this means either a hotel or resort suite is reserved. For ground transportation, people generally rent a car from one of the major car rental firms. It is here in the car rental arena where the present invention, in one of its preferred embodiments, focuses and adds considerable value to the consumer. Quite simply, in one embodiment, if the consumer places a rental order through a central sports rental Web site such as GOLFRENT.COM, the renting company that operates the Web site, makes all rental arrangements for the consumer ahead of time, and permits the consumer to pick up leading-edge golf clubs or other equipment of his or her choice, at the same time as the consumer picks up the rental car from the airport car rental parking lot. The clubs or other equipment are already in the trunk of the car being rented.

The renting company's Web site is a site that provides various functionality for allowing consumers to rent items and perhaps also purchase them upon completion of the rental term. Typically, this site is operated by a renting company that handles all of the various rental processing, equipment display and availability information, inventory management, rental fee processing, delivery options and arrangements, consumer service tasks and the like associated with the rental of specific items of sports equipment to consumers at locations all over the world.

Because the renting company handles all the tasks of processing online rental orders, shipping items, collecting payment, and providing consumer service, the renter need not be concerned with these tasks.

Further details of the operation of the invention are set forth in more detail below. With the present invention, the utility and convenience benefits to the consumer are clear.

2. System and Business Components.

Figure 1:
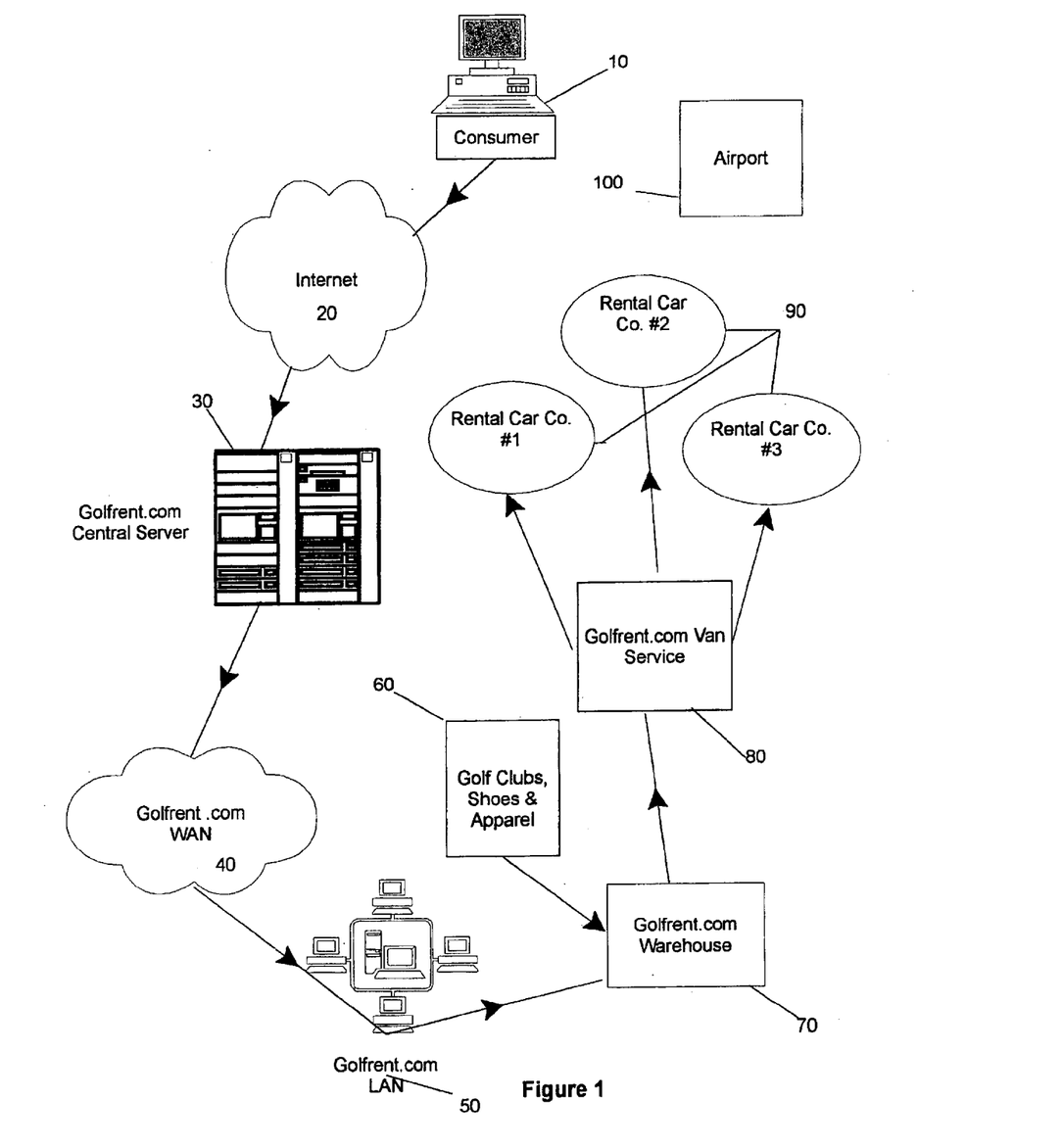
FIG. 1 is a high-level pictorial drawing illustrating the primary components and relationships of a system and method that operates in accordance with the present invention.
Figure 2:
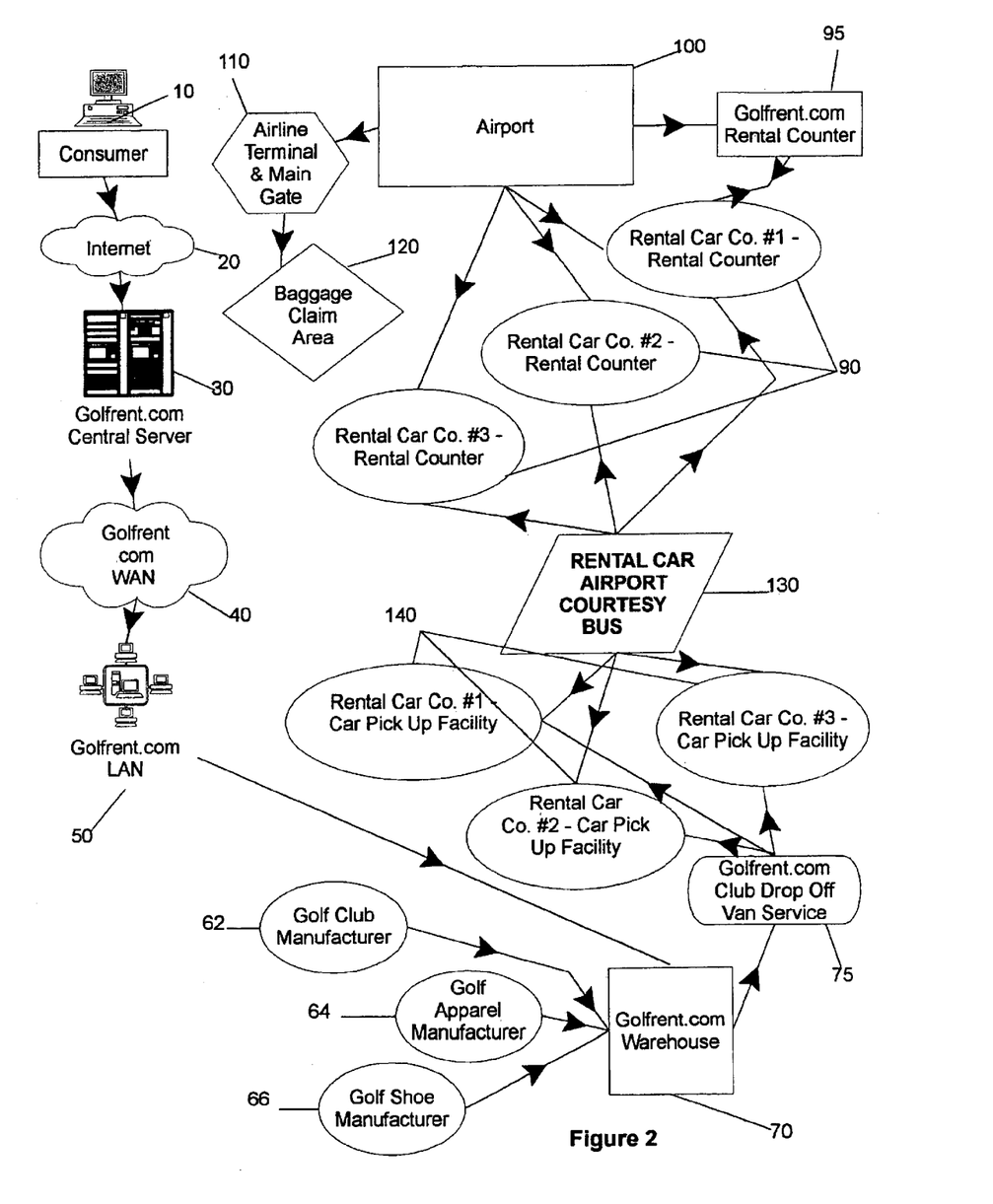
FIG. 2 is a more detailed pictorial drawing of FIG. 1.
Figure 3:
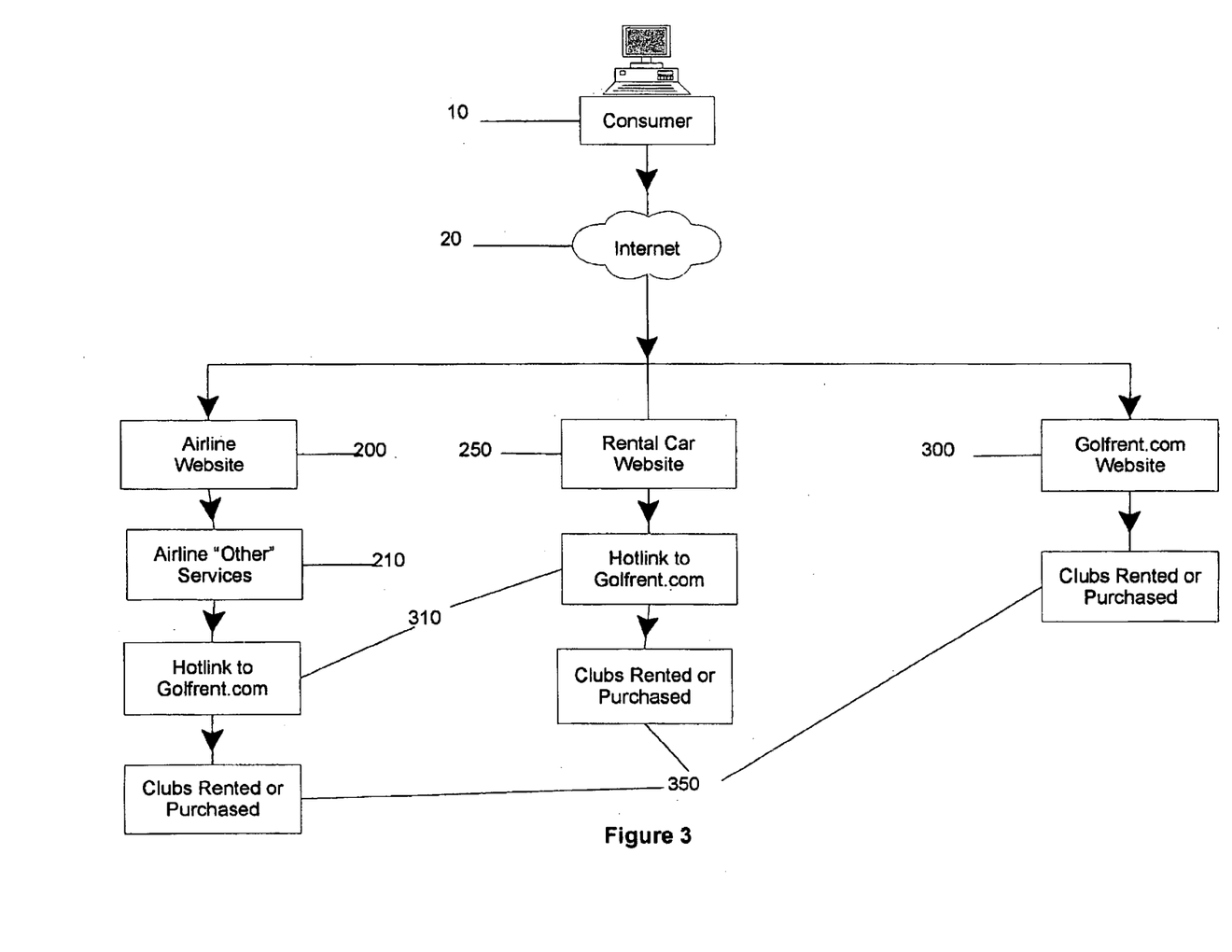
FIG. 3 is a high-level flow diagram illustrating a rental transaction sequence from the viewpoint of the consumer in accordance with the present invention.

FIG. 1 is a high-level pictorial drawing illustrating the primary components and relationships of a system and method that operates in accordance with the present invention. FIG. 2 is a more detailed pictorial drawing of FIG. 1. FIG. 3 also gives a broad overview.

Looking first at FIG. 1, there are several basic physical components and business entities used in the present invention. They are:

1) One or more consumer personal computers (PCs) 10, each running a standard Web browser, in communication with a rental Web site such as GOLFRENT.COM 300 (see FIG. 3) over the Internet 20.

2) Operational and back-end support (such as database management, consumer tracking, inventory and equipment tracking, credit card processing, fulfillment and communications) for the Web site are provided by a WAN 40, LAN 50 and hand-held devices (not shown).

3) A Golfrent.com rental counter/kiosk 95 (see FIG. 2) at an airport 100.

4) One or more car rental counters/kiosks 90 at the airport 100.

5) One or more rental car airport courtesy buses 130.

6) One or more rental car pick up areas 140 just outside of the airport 100.

7) Sports equipment suppliers, such as golf club, shoe and apparel manufacturers 60, 62, 64, 66.

8) A Golfrent.com warehouse 70 just outside the airport 100.

9) A Golfrent.com van service 80 affiliated with the warehouse 70.

Figure 4:
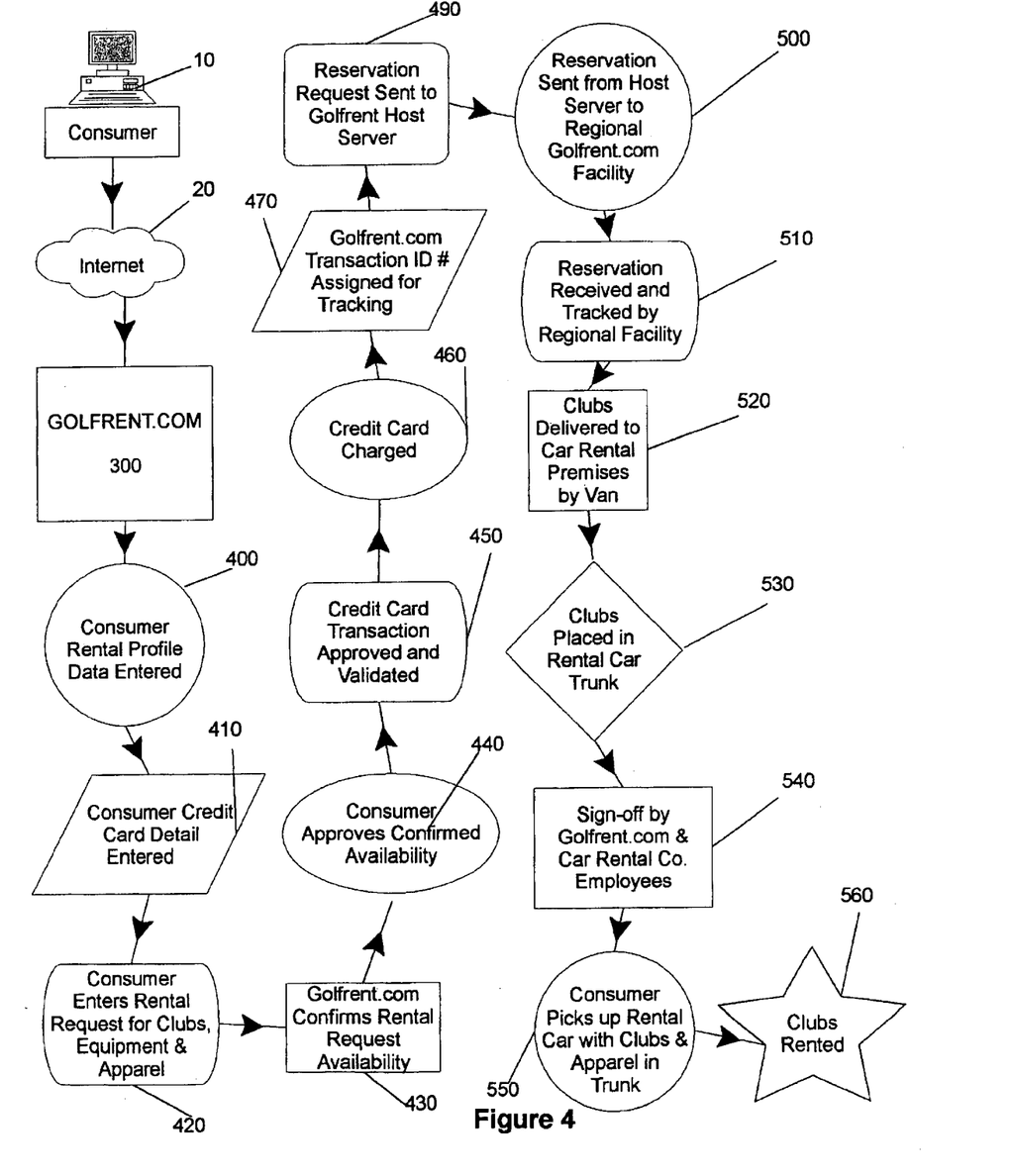
FIG. 4 is a more detailed flow diagram of illustrating a rental transaction sequence in accordance with the present invention.

1) PCs LAN, WAN and Central Server. The consumers 10 have his or her PCs at home or at the office and have an agreement with ISP providers to gain access to the Internet 20. The PCs have enough memory and processing power to conduct E-Transactions over the World Wide Web with a reasonable amount of proficiency. It is not expected that the system and method of the present invention will exert any substantial system utilization strain that would tie up too many resources on one's PC. The E-commerce activity described in FIG. 4 is carried out by the consumer 10 to make the golf club or other sports renting process a mainstream event in today's business environment.

Each Golfrent.com warehouse 70 has a LAN 50 arrangement that has several PCs in communication with each other to provide tracking of the Golfrent.com process from the transaction stage to rental to return of the clubs or other equipment. This LAN arrangement at the warehouse 70 supports the ongoing process of the day-to-day activity of the club rental process. It also receives data from the field as it relates to the on-site tracking of clubs or other equipment. In one embodiment, industry standard tracking technology may be used to both track the clubs or other equipment and generate a receipt to the consumer 10 in the field. For example, Hertz® Rental Car Co. currently uses hand-held tracking devices that generate a receipt to the consumer upon return of the rented car. Such devices are easily adapted for tracking sports items.

Also, in another feature and preferred embodiment of the invention, an additional hand-held device is used for bar-code tracking of individual clubs or other items themselves. Each golf club that is rented is affixed with a bar code indicator that is swiped with industry standard technology upon delivery and return of the clubs. For example, Federal Express® Corp. and other overnight couriers use this type of technology to track the whereabouts of packages they deliver. In this way, the location of the rented items may be tracked while also giving the consumer 10 the ability to drop off the clubs or other equipment after use with the least amount of effort.

The Golfrent.com WAN 40 is connected to all of the various regional LAN 50 sites around the country. It aggregates all of the rental data that is generated and feeds it back to the Golfrent.com host central server 30. The WAN 40 will also be utilized to distribute rental information as it is received from the consumer via the host Golfrent.com server.

Finally, the Central Server 30 is the main data processor for all of Golfrent.com E-commerce activity. It contains built-in redundancy to ensure 24/7 operation, and may either operated either in-house or on an outsource basis.

2) The Golfrent.com Rental Counter/Kiosk at the airport: The Golfrent.com rental counter 90 at the airport 100 will typically be located near the baggage claim area 120 of an airport 100. The reason for this is that the traveler usually finds all of the Car Rental rental-counters 90 near the baggage claim area 120. As an alternative, the traveler can also walk up and select his or her preferred set of clubs or other equipment to go with the rental car, if in fact the equipment was not reserved ahead of time. The Golfrent-.com kiosk or counter is staffed by a knowledgeable employee or other person who will help the consumer 10 make club selection or otherwise select the proper equipment. The Golfrent.com kiosks are also be outfitted with PCs that provide connectivity to the WAN 40 and Central Server functions.

3) The Rental Car Courtesy Bus: Once a consumer 10 has traveled through the airport 100 facility, he or she needs a method of transportation to get to the actual car rental pick up facility 140. All of the major car rental firms 90 currently provide courtesy buses 130 to take his or her consumers to the car rental pick-up area. Golfrent.com takes advantage of the fact that this need is already fulfilled. Such buses bridge two (2) main focal points of onsite activity at an airport, namely, the car rental counters 90 by the baggage claim and the actual car pick-up area.

4) The Rental Car Pick Up Area Outside of the airport: This is where a tremendous amount of activity takes place. Golfrent.com delivers much of its value to the consumer 10 at this point in the process. The consumer 10 is tired after a long flight and will not want to spend a tremendous amount of time waiting for a rental car. Likewise, top-of-the-line rental clubs or other equipment are great if they don't cost the traveler a lot of extra time being in a place the traveler does not want to be in anyway. Therefore, Golfrent.com has an on-site employee or other staff person (on or near the car rental site) who will receive the golf club deliveries from the golfrent.com van service 80. This on-site employee will ensure that the clubs or other equipment are placed in the trunk 530 of the cars to be picked up by the consumer 10. The Golfrent.com employee has a golf cart type vehicle that will shuttle the clubs or other equipment from the van service 80 to the trunk 530. The on site employee will also utilize hand-held devices used for bar code club tracking and auto receipt generation so that the consumer 10 is on his or her way in an expedient fashion. The hand-held devices will send all relevant data back to the warehouse 70 LAN 50 host and onto the WAN 40 and host central server 30.

5) The Golf Club, Shoe and Apparel Manufacturers: This is a multi-billion dollar
industry that has been booming for the last several years. All of the manufacturers spend considerable money trying to advocate the use of its products among consumers 10. The difficult part of trying these products is that the traveler must normally buy them to try them. Since most of the products are expensive, it limits the consumer's ability to try the "latest and greatest" products. Golfrent.com provides a service by delivering "top-of-the-line" clubs or other equipment and shoes to the consumer 10 on a timely basis. In addition, they seek to give consumer 10s an outlet to try new equipment 60 on a rental basis, with the ability to outright purchase it if the consumer 10 desires. The manufacturer 60s will ship his or her clubs or other equipment, shoes and apparel directly to the regional Golfrent.com warehouse 70 where it is received and placed in inventory for rental and/or purchase. The airport 100 is a natural fit to deliver the equipment 60 since that is where is rented.

6) The Golfrent.com Warehouse just outside the airport: In one embodiment of the invention, Golfrent.com owns or leases warehouse 70 facilities in each major warm weather resort. The location is next to the car pick up facilities at the warm weather resort airport 100. The warehouse 70 contains all of the equipment 60 that is available for rent from the golf manufacturer 60 described above. The warehouse 70 is staffed by Golfrent.com employees or other personnel. On site employees will handle all of the rental equipment 60 whether it is being received from the manufacturer 60, being prepared for rental or being cleaned up and restocked for future rental. There is industry standard shipping and receiving activity on a daily basis. Further, the employees will load up the Golfrent.com van 80 that takes the clubs or other equipment over to the rental car pick up facilities for placement in the trunk 530. There is a LAN 50 setup at each warehouse 70 that will track all rental data from the field on a daily basis. This capability extends to the two-way communication that is provided by the LAN 50 and hand-held devices used by the Golfrent.com employees on site at the car rental companies.

7) The Golfrent.com Van Service affiliated with the warehouse functions: In one embodiment of the invention, Golfrent.com maintains a fleet of vans or other vehicles in a van service 80 that support the airport 100 based series of warehouses 70. These vans shuttle the daily required club rentals from the golfrent.com warehouse 70 to the car rental pick up facilities for placement into the trunk 530 of the rented cars.

3. Rental Operations

To start the rental process, the consumer 10 starts at his or her PC. Most individuals now have PCs in their homes or offices and further, use E-Commerce as a means of conducting business that was once only done face to face. When booking a trip a consumer 10 can now rent an E-ticket from any major airline Website 200. Next, the consumer 10 can go to any major car rental website and reserve a rental car. At either the airline, rental car or golfrent.com Website 300, the consumer 10 will now be able to rent golf clubs or other equipment for use at his or her golf resort destination. Golfrent.com has alliances with the major airlines 101 and car rental companies. A commercial agreement is arranged whereby airline and rental car companies have a hotlink 310 button on his or her website(s) that link the consumer 10 to Golfrent.com once they have completed his or her lodging or ground transportation transaction. If they are aware of Golfrent.com then they would simply go to this site on his or her own.

The Internet 20

The consumer 10 uses the public Internet 20 to access the commercial websites described above. Today, secure transaction processes are in place that make this type of commerce viable and accepted. The consumer 10 will reserve the desired rental clubs or other equipment, golf shoes and golf apparel that are desired by navigating through the Golfrent.com Website 300. The consumer will point and click his or her way through drill down menus to select from a host of golf club equipment 60. The variety of club types and manufacturer 60s is extensive. Once the consumer 10 has made the reservation (specific renter steps describer in FIG. 4), he or she will then execute a credit card based e-commerce transaction in order to secure the desired club rental at a future date. At this point the consumer 10 forgets about the golf clubs or other equipment he or she will require until they go to pick up his or her rental car.

Golfrent.com

Once the consumer 10 has concluded his or her e-commerce transaction, the order for the club rental is routed from the public Internet to the Golfrent.com server/host 300. Once the order is received by the host server it is quickly sent to the Golfrent.com WAN 40 and then ultimately to the appropriate golfrent.com LAN 50 site that services the particular rental request 420. Each LAN 50 location has a Golfrent.com warehouse 70 situated at a major warm-weather site.

Golfrent.com Warehouse, Clubs & Van Service

Each Golfrent.com warehouse 70 is constructed in scale to support the golf rental activity in a given resort city. All warehouses 70 will adjoin the clusters of rental car dispatch facilities at the airport 100. This is done precisely to take advantage of the proximity of the consumer 10 and the rental car. Golfrent.com takes in deliveries of golf clubs or other equipment, golf apparel and golf shoes from the manufacturer 60s and maintain an adequate supply of each to meet demand. Golfrent.com employees takes in the equipment 60 and stocks it accordingly. When a club rental is generated the warehouse 70 staff will load up the Golfrent.com van 80 with the clubs or other equipment for delivery within the airport 100 rental car complex. For example they will start with the first delivery of the day to Hertz rental car and then move on to Avis, Budget and so on. Likewise, when rental cars are returned with the rented clubs or other equipment, Golfrent.com van service 80 will pick up the rented clubs or other equipment and return to the Warehouse for cleaning, prep and re-stocking.

The Airport and Rental Car Company Pick-up Area

The consumer 10 has rented, used and returned the clubs or other equipment precisely where they picked them up so easily in the first place, at the airport 100 car rental lot. The ease in which they were rented is replicated upon return. The consumer 10 simply pulls into the rental car lot and goes through the process of checking the rental car in. At the same time a Golfrent.com employee will perform a face-to-face check in of the clubs or other equipment. They are inspected for any severe wear and tear that is above and beyond the norm. Once this is done, the consumer 10 is on his or her way to the actual airport 100 to catch a flight back home or to another destination.

Golfrent.com make top quality clubs or other equipment available to the consumer 10 with dramatic ease. It enables the seasoned or novice golfer to try clubs or other equipment that are new to the market, without having to make an immediate purchase of the clubs or other equipment. The cornucopia of club selection is pleasantly surprising to the consumer 10.

Turning now to FIG. 3, the broad steps taken by a consumer 10 to rent golf clubs or other equipment over the World Wide Web typically will occur via one of three (3) main paths. They are:

1) Via an Airline Web Site Hotlink 310
2) Via a Rental Car Web Site Hotlink 310
3) Via the Golfrent.com Web Site.

The consumer 10 will start by navigating his or her way on the Internet 20 to the home page of the desired company providing either Airline Travel, Rental Car Services or directly to the Golfrent.com home page.

1) Airline

The consumer 10 may choose to book an airline ticket over the Internet 20. This is quickly becoming an accepted medium for airline commerce. Once at the site the consumer 10 will navigate 110 through to completion of his or her e-ticket transaction. Within an airline Website 200 there is typically a section termed "other services" which is an area where additional value added services are offered that go beyond the airline ticketing process. Golfrent.com will strike an alliance with each of the airlines which will allow Golfrent.com to offer golf rental services from the airline Website 200. Once the consumer 10 clicks into the "other services" section they has the opportunity to hotlink 310 to the golfrent.com Website 300 to arrange for golf club rental of his or her choice. Once they are at the Golfrent.com Website 300 then an E-commerce transaction is completed and clubs or other equipment are rented. The consumer 10 has to input all related rental car information to insure proper club delivery and handoff.

2) Rental Car

Natural partners are created frequently that benefit the two organizations involved. The Golfrent.com invention works especially well with the car rental companies because his or her main products are complimentary to one another. There are also significant marketing opportunities that is advanced between two such complimentary partners. The rental car web site is another good fit for Golfrent.com to establish a hotlink 310 to its site from the car rental site. More and more consumers are starting to rent his or her vehicles for business or pleasure, through the Internet 20. All of the major car rental firms 90 have web sites that allow for an E-transaction to be completed for rental car purposes. Like the airlines, most car rental sites have an "other services" section to his or her site that gives people the opportunity to rent value added goods and services. The one that comes to mind most frequently with car rental firms 90 is the cell phone. Almost all rental firms 90 offer his or her consumer an opportunity to rent a cell phone at the time they rent a car. Golfrent.com is a natural extension of the cell phone, value added service concept. Consumers can quickly reach a Golfrent.com hotlink 310 from the car rental site. This will allow the consumer 10 to rent his or her clubs or other equipment at the same time as they reserve his or her car. This is the most frequent method of non-direct rental activity. But as discussed before, current methods of renting cell phones have not been adequately extended to larger equipment.

3) Golfrent.com

One important method of E-commerce rental activity is when the consumer 10 decides to go direct to Golfrent.com to reserve his or her clubs or other equipment. When the consumer 10 does rent directly through Golfrent.com, the consumer 10 is responsible for providing the rental car reservation details to golfrent.

The specific steps taken by a renter of Golfrent.com clubs or other equipment and accessories starts when the consumer 10 reaches the Golfrent.com Website 300 via one of the three (3) previously mentioned access routes. To review, the consumer 10 reaches Golfrent.com either by hotlink 310 from the airline's web site, hotlink 310 from the rental car web site or by going directly to the Golfrent.com site.

1) Consumer Rental Profile (@Golfrent.com)

Once the consumer 10 reaches Golfrent.com for the first time he or she is asked if they are a current Golfrent.com consumer or a visitor to the site for the first time. If they have never been to the site and wish to reserve clubs or other equipment, then the consumer 10 is required to fill out a Rental Profile. This profile will contain all of the key information fields necessary to track a consumer going forward. Standard information such as name, address, phone number and E-Mail address is required. A password will then be set up for the consumer 10 to assist in the login process for future rentals. Consumers will also use this log in capability to track account history.

2) Consumer Credit Card Detail

The consumer 10 is asked to enter a major credit card for payment. As is becoming standard for the E-Commerce businesses, secure transactions is used within the Golfrent.com invention. Consumers are not allowed to proceed to the club selection and rental portion of the process unless they have entered the appropriate credit card information 3) Consumer Rental request for Clubs, etc.

Once all of the above takes place the consumer 10 is led to the portion of the website that is dedicated to the club selection process. It is here where the consumer 10 will experience the power of choice in the club rental process. No longer does the consumer 10 have to drag clubs or other equipment long distance to the travel destination of his or her choice. Further there is no need to use clubs or other equipment that are not appropriate for the golfer given the experience level and/or desire to rent and try some of the leading-edge clubs or other equipment that are offered by the manufacturer 60s on a year to year basis. Golfrent.com carries all of the latest clubs or other equipment from the manufacturers 60 that consumer 10 wish to try out but have never before had a medium by which to do so.

The consumer 10 is given a series of drop down menus from which to choose. The selection process of clubs or other equipment is quite extensive. The Golfrent.com invention allows the consumer 10 to design a custom set of golf clubs or other equipment. This is done by allowing the consumer 10 to choose from one of (4) areas of club availability 430. In one embodiment, they are:

1) Woods (Driver & Fairway woods)
2) Irons (3 iron through 9 iron)
3) Wedges (Pitching Wedge and Sand Wedge)
4) Putter (choice of putter).

The consumer 10 literally gets to create his or her own custom set of clubs or other equipment from the above (4) selection criteria. Golfrent.com makes available from one to two dozen of each of the major categories described above. What that means is that if the traveler wants to rent Callaway Big Bertha Woods, Titleist DCI Irons, Cleveland Wedges and an Odyssey putter, to create the traveler's dream set of clubs or other equipment, the traveler can. Therein lies the power of Golfrent.com to the consumer 10. It is the power of choice on a rental basis.

It is in the drop down menu selection area that the consumer 10 will make his or her choices for his or her next travel engagement. Once the consumer 10 has made his or her selection they approve the selection in order to move to the next phase of the rental process.

4) Golfrent.com Confirms Rental Request:

The consumer 10 completes his or her rental request 420 that may include; clubs or other equipment, shoes and apparel. The order template is filled out and the consumer 10 clicks "OK". Golfrent.com then shows the complete order to the consumer 10 for review purposes and then asks the renter if the rental detail is complete and accurate. If the consumer 10 replies "OK" then the order is sent to Golfrent.com to check availability 430 of clubs or other equipment to be rented.

5) Consumer Approves Confirmed Availability: Golfrent.com performs a quick inventory check to make sure that the requested clubs or other equipment is available on the day the renter wishes to pick them up. Golfrent.com then delivers a message back to the consumer 10 that the clubs or other equipment is ready for rental on the chosen rental day. Next Golfrent.com asks the renter "Does the traveler wish to reserve the clubs or other equipment now?" The consumer 10 at this point responds "OK" to proceed to the financial transaction portion of the process.

6) Credit Card Transaction Approved and Validated: Once the consumer 10 approves the "Confirmed Availability 430" Golfrent.com moves the consumer 10 onto the payment portion of the process. The renter has already entered his or her (2) preferred credit cards into his or her profile in Step 2 above. Golfrent.com will now take this credit card and check with the credit card issuer to request credit approval for the dollar rental amount in question. Golfrent.com is ready to complete the transaction pending the card issue approval.

7) Credit Card Charged:

Once the credit card issuer sends an approval message, Golfrent.com proceeds to charge the dollar amount of the rental to the renter's credit card. All Golfrent.com rental transactions are charged 460 at the time of the rental.

8) Golfrent.com Transaction ID Number Assigned for Tracking:

Once the credit card is charged 460, Golfrent.com proceeds to process the order. One of the main functions performed at this point is assigning a Transaction ID number to every Golfrent.com rental request 420 that is filled. This unique transaction number is used to track the rental request 420 going forward.

9) Reservation Request sent to Golfrent.com Host:

Once the transaction ID is assigned 470 to the order, Golfrent.com routes the order to the Central Host Server. All details of the order are now complete. The club rental specification, credit card transaction and Transaction ID are all recorded in the central host database. The order is next routed to the appropriate regional Golfrent.com facility.

10) Reservation sent from Host to Regional Golfrent.com Facility:

Golfrent.com takes the newly created transaction record and forward that off to the regional Golfrent.com facility that will service the request. Both the central host and the regional facility has each consumer 10 transaction almost immediately after the transaction is complete and is routed properly.

11) Reservation received and Tracked by Regional Facility:

The reservation is received and tracked by the regional Golfrent.com facility. The order is tracked so that the clubs or other equipment are available and on hand for the day of the actual rental. Various checks must be performed so that adequate rental equipment 60 is in the warehouse 70. Coordination with all of the necessary manufacturers 60s takes place at this point.

12) Clubs delivered to Car Rental Premises by Van:

On the actual day of rental pick up Golfrent.com takes the day's orders and preps the supply of clubs or other equipment for delivery to the car rental facility. All consumer orders are filled. The clubs or other equipment are loaded onto the Golfrent.com van 80 and are delivered to the various rental car companies that have standing orders in with Golfrent.com. All of the Golfrent.com clubs or other equipment is individually bar coded for tracking so that once they leave Golfrent.com, the exact whereabouts of the clubs or other equipment are known at any given time. This is the bar code tracking technology used by courier companies today.

13) Clubs are Placed in the Rental Car Trunk: Golfrent.com places the sets of rented clubs or other equipment in a golf cart-like vehicle that will very quickly move about the car rental compound. This agile vehicle will carry many sets of clubs or other equipment and the Golfrent.com employee will coordinate with on site car rental company employees to place the actual clubs or other equipment in the trunk 530s of the cars that are rented.

14) Sign-off by Golfrent.com and Car Rental Company Employees:

Once the clubs or other equipment are placed in the trunk 530 of the rental car then there must be a sign off process whereby both the Golfrent.com employee and the car rental company employee acknowledge that the clubs or other equipment were in fact received and placed in the trunk 530 of the car. This sign off is a crucial part of the drop off process since there is a host of liability issues with insuring that the clubs or other equipment do not become misplaced or stolen.

15) Consumer Picks up Rental Car with Clubs & Apparel in Trunk:

At this point the Clubs are 99% rented. The time has come for the consumer 10 to land at the airport 100, take the courtesy car rental shuttle bus over to the car rental compound and pick up the rental car. It is at this point that consumer 10 goes to his or her rented vehicle and check the trunk 530 to find that the desired golf clubs or other equipment, shoes and/or apparel are there waiting for them as they begin his or her visit to his or her chosen warm weather resort area.

16) Clubs are Rented:

The clubs or other equipment are rented after the rental car is picked up and the driver has inspected his trunk 530 to confirm his/her order. Typically, a copy of the order is left in the trunk 530 for consumer 10 confirmation purposes.

4. Equipment Return Operations

Figure 5:
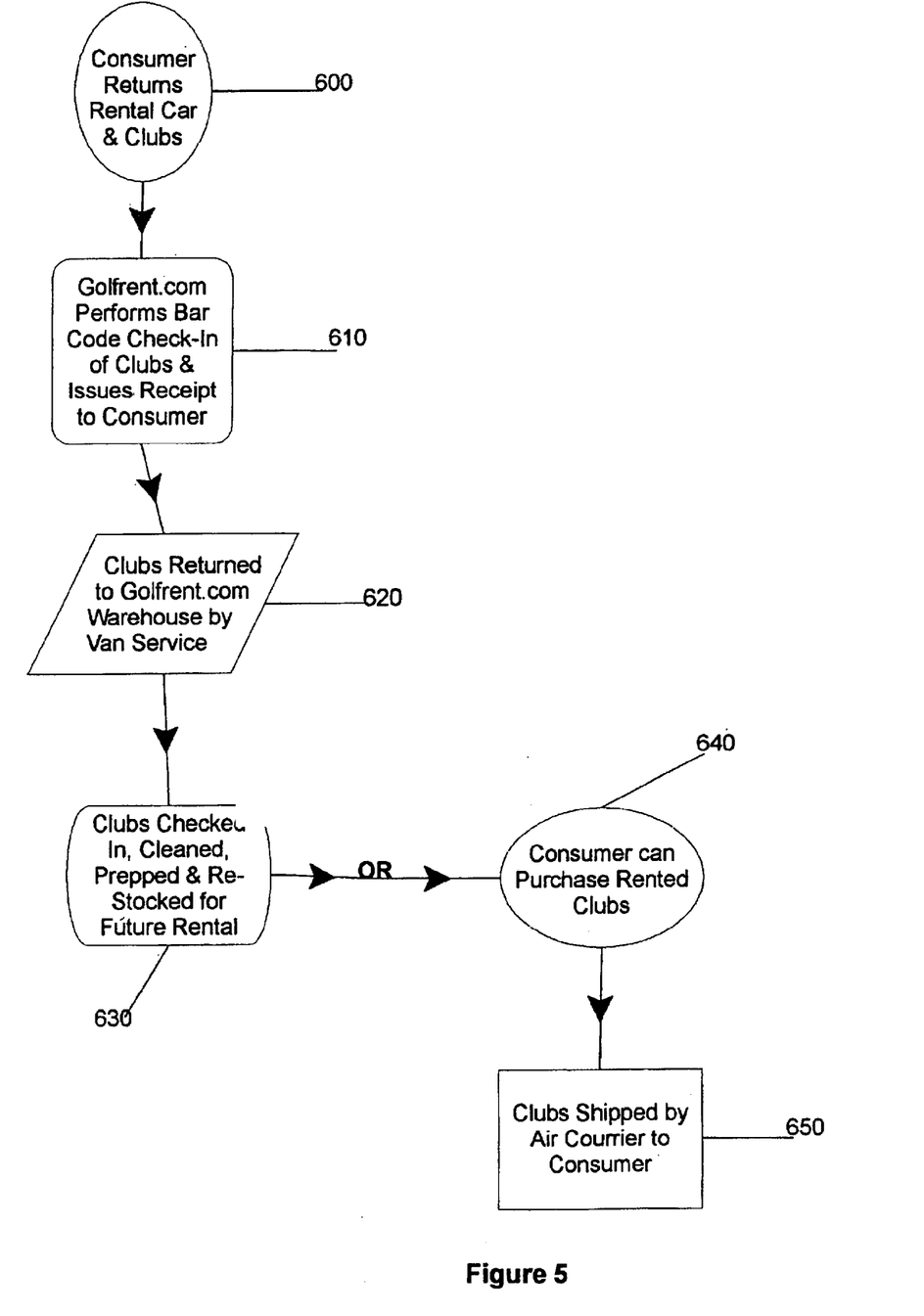
FIG. 5 is a flow diagram of an equipment return step of the present invention.

After using the clubs or other equipment, the consumer 10 returns the rental car to the rental car compound. It is here at the drop off facility that both the car rental employees and the Golfrent.com employee work hand in hand to expedite the return of both the rental car and golf clubs or other equipment.

Bar Code Check-in and Receipt Generation:

The check-in process is a brief experience for the consumer 10. One of the ways in which Golfrent.com moves things along is with bar code check in technology. Each golf club is affixed with a unique ID bar code for tracking. This insures that the clubs or other equipment that were rented are the clubs or other equipment that were returned. This must match up with the bar code entry that was recorded when the clubs or other equipment were first rented. A quick bar code read of the clubs or other equipment will allow the Golfrent.com employee to quickly confirm receipt of the originally rented clubs or other equipment and allow movement to the receipt generation phase. Golfrent.com already has all of the credit card detail in its database from when the clubs or other equipment were rented. The consumer 10 will now receive a hardcopy receipt. This receipt is generated by a hand-held Golfrent.com device. The hand-held technology may be similar to that which is in use today at many of the top car rental firms 90.

Clubs Returned to Golfrent.com Warehouse by Van Service:

The clubs or other equipment are then taken from the consumer rental car and placed onto the Golfrent.com shuttle cart. The shuttle cart aggregates 110 the returns and place them into the waiting Golfrent.com van 80 that takes the clubs or other equipment from the car rental facility back to the warehouse 70.

Clubs Checked In, Cleaned, Prepped & Re-stocked for Future Rental:

Once the clubs or other equipment have been returned to the warehouse 70 they are received from the van service 80 by ground Golfrent.com employees who take in the sets of clubs or other equipment and bring them inside for check-in and cleaning. The clubs or other equipment should be returned by the consumer 10 cleaned but in the event that they are not, Golfrent.com cleans them up and readys them to be re-stocked for future use. The clubs or other equipment are then re-stocked for future rentals or they are made ready for shipping for a consumer 10 who wishes to purchase them.

Consumer Can Buy Rented Clubs:

The consumer 10 may decide that after renting and using the clubs or other equipment, that he or she may want to outright buy the clubs or other equipment since they are to his or her liking. In this case the consumer 10 lets the on-site Golfrent.com employee (at the car rental compound) know that he or she wishes to outright buy the clubs or other equipment. The Golfrent.com employee continues to collect the clubs or other equipment and returns them to the Golfrent.com warehouse 70. It is here that they are readied for shipping back to the consumer 10 for sale.

Clubs Shipped by Air Courier to Consumer:

The clubs or other equipment being purchased are cleaned and packaged for shipment to the rental consumer 10's address of choice. The consumer 10 is aware of the cost of the clubs or other equipment since that is noted on his or her web confirmation as a future option. Further, all other hard copy documentation will list the purchase price of the clubs or other equipment. This saves the consumer 10 time when they are trying to make a flight back home. The same credit card would be charged the full purchase amount since Golfrent.com already has this information on file.

5. Conclusion.

The present invention, reflected in Golfrent.com, is a totally new business method for handling rental equipment in the sports industry via the Internet. Business travelers no longer have to haul a bulky set of golf clubs or other equipment from home, to the airport, to his or her rental car, to his or her hotel and finally, to the golf course. They simply click, rent; show up at the airport, pick up his or her rental car and his or her clubs or other equipment of choice are already in the trunk and ready for the $1^{st}$ tee!

Leisure travelers now have the opportunity to pack and travel lighter. The experienced golfer/leisure traveler can click and rent some of the latest golf clubs or other equipment the manufacturer have come to market with, without actually having to spend hundreds or even thousands of dollars to try them. Novice golfers who are not sure they are committed to the sport benefit by giving themselves a real taste of a first-class golfing experience. Either novice or accomplished golfers may decide to outright buy the clubs or other equipment if they wish.

Figure 6:
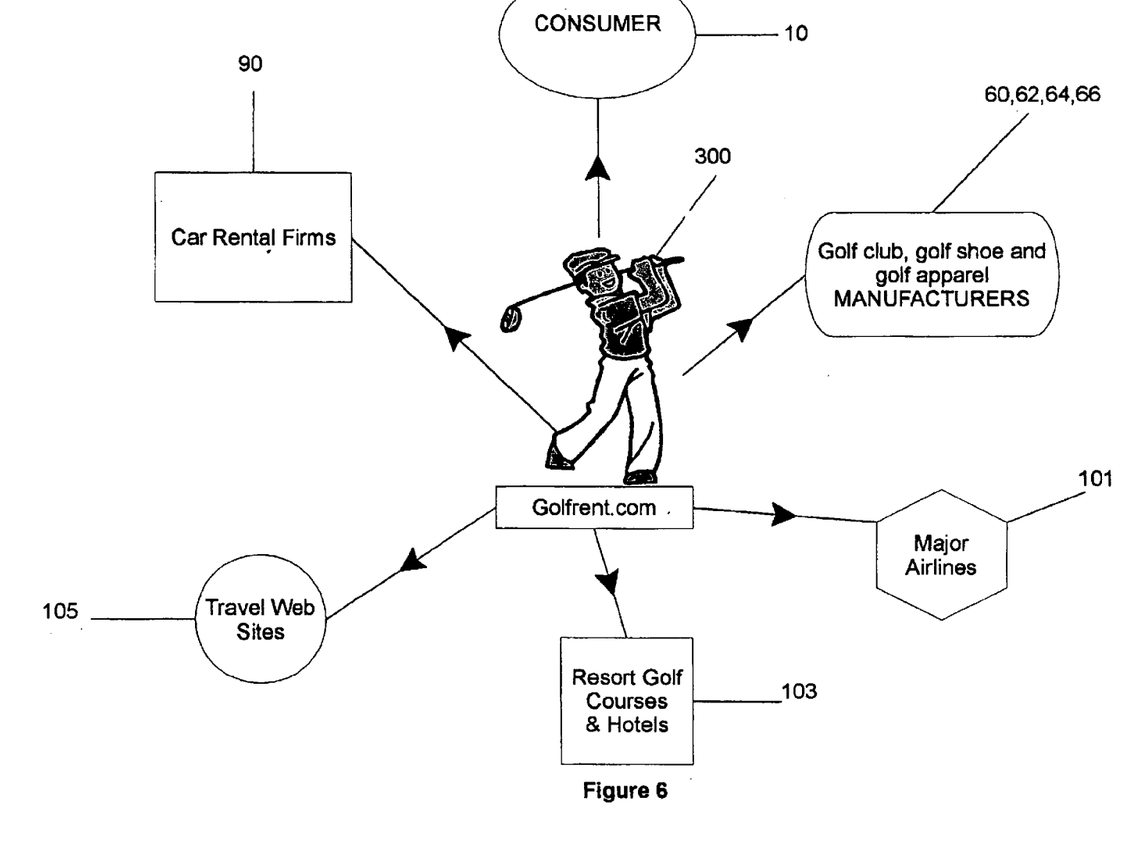
FIG. 6 is a high-level pictorial drawing illustrating the relationships between the present invention and other persons and businesses, and the synergy thus created.

There is no doubt that the consumer is the big winner in the "Circle of Synergy" shown in FIG. 6. However, there are also other interesting partnering synergies with the Commercial Participants that are created with Golfrent.com at the center of the Circle. In one way or another the Car Rental firms 90, the Golf Equipment Manufacturers (clubs or other equipment, shoes & apparel), the Major airlines 101, Resort Hotels 105 and Resort Golf courses 103 directly benefit from the synergy created by Golfrent.com. These (5) partner industries stand to directly benefit from the Golfrent.com model by taking advantage of the "Circle of Synergy" business keys:

1) Potential for revenue share arrangements with Golfrent.com.
2) Ability to get new products to a specific target market quickly.
3) Increased brand awareness.
4) Co-marketing benefits.
5) Pure value added to his or her established consumer base.

Car Rental Firms:

These organizations deliver value to the traveler by offering automotive convenience. They also extend value added services to his or her consumers by offering such services as cell phone rental at the time of car rental. This is a nice convenience. The ability to rent a car, cell phone and a set of clubs or other equipment makes a nice package when the consumer is traveling to Scottsdale, Ariz., for example, for a business conference and want to get a round or two of golf in while the traveler is in this beautiful state. The traveler has already got the traveler's briefcase and suitcase. Does the traveler really want to haul clubs or other equipment to Arizona in addition? Car rental firms can also look at a revenue share invention with Golfrent.com for every set of clubs or other equipment that is placed in the trunk of one of its cars.

Major Airlines:

The major airlines 101 provide value to his or her consumer base with quick and safe air travel to a resort destination. The benefit to striking an alliance with Golfrent.com would be primarily due to the co-marketing benefits available by sponsoring a hotlink 310 from the airline web site to Golfrent.com. Likewise, Golfrent.com could promote special deals with the airlines if they rent clubs or other equipment from Golfrent.com. Brand awareness of both companies is raised to a new level.

Golf Club, Shoe and Apparel Manufacturers:

These participants benefit from almost all of the above (5) Circle of Synergy keys. Revenue share is achieved either with each rental of golf equipment 60 or if the consumer 10 decides upon outright purchase. All (3) equipment 60 manufacturer 60s clearly get new products to market rapidly since they will outfit Golfrent.com with the very latest in golf equipment 60, ready for the consumer 10 to try before they go back and wait for winter to subside. Brand awareness would by at the forefront with each of the manufacturer 60s competing vigorously to outfit Golfrent.com with the latest clubs or other equipment. They would be focused on heavy advertising of his or her products being "Now Available on Golfrent.com." The co-marketing benefits exist mostly on the web where the manufacturer 60s and Golfrent.com could promote each other via his or her web sites, using hotlink 310s to one another.

Resort Hotels:

The resorts benefit from a relationship with Golfrent.com by way of co-marketing opportunities. Certainly the resorts wouldn't mind having his or her accommodations available on the Golfrent.com Website 300 and vice versa. A side benefit of this would be increased brand awareness.

Resort Golf Courses:

Co-marketing opportunities exist between Golfrent.com and the major premium resort golf courses 103. Mutual website advertising and hotlink 310 capabilities make a lot of sense here. The invention is enhanced by allowing the consumer 10 to make preferred tee times with the premium golf courses 103 via a hotlink 310 from Golfrent.com to the courses directly. These resort courses are very keen to have all those travelers, rental cars & CLUBS possess economic & marketing reasons to play their golf course.

While the invention has been described herein with reference to certain preferred embodiments, these embodiments have been presented by way of example only, and not to limit the scope of the invention.

What is claimed is:

1. A method of configuring, renting and delivering customized bundles of heavy and bulky physical golf equipment items using the Internet and delivery vehicles and storage facilities, the method comprising the steps of:

establishing an Internet World Wide Web site, the site operating as an interactive consumer interface for consumers who wish to rent at least one customized bundle of golf equipment items at predetermined lodging facilities, airports or rental car facilities and at predetermined future times, the lodging facilities, airports and rental car facilities including locations that are geographically located away from golfing locations where the items are to be used;

receiving and storing a customized rental reservation for a customized bundle of a plurality of golf equipment items from a consumer at the site, each item being individually selected and configured by the consumer using the site at the time the rental reservation is made, the items desired to be rented by the consumer at a designated lodging facility, airport or rental car facility at a designated future time for a designated rental period;

receiving and storing personal information and payment information from the consumer at the Web site;

storing a plurality of golf equipment items at a storage facility;

assembling and configuring the items selected by the consumer so as to create a customized rental bundle of complementary golf equipment items in accordance with the consumer's rental reservation and configuration;

delivering the rental bundle from the storage facility to the consumer at the lodging facility, airport or rental car facility designated by the consumer at the time designated by the consumer; and receiving the rental bundle from the consumer and returning the rental bundle to the storage facility at the conclusion, of the rental period.

* * * * *